United States Patent
Schaude et al.

(10) Patent No.: US 8,893,078 B2
(45) Date of Patent: Nov. 18, 2014

(54) SIMPLIFIED BUSINESS OBJECT MODEL FOR A USER INTERFACE

(75) Inventors: Horst Schaude, Kraichtal (DE); Jens Kisker, Heidelberg (DE); Ralf Helmut Philipp, Altussheim (DE)

(73) Assignee: SAP AG, Walldorf (DE)

(*) Notice: Subject to any disclaimer, the term of this patent is extended or adjusted under 35 U.S.C. 154(b) by 693 days.

(21) Appl. No.: 12/848,022

(22) Filed: Jul. 30, 2010

(65) Prior Publication Data

US 2012/0029929 A1    Feb. 2, 2012

(51) Int. Cl.
*G06Q 10/06* (2012.01)
*G06Q 10/10* (2012.01)

(52) U.S. Cl.
CPC .............. *G06Q 10/06* (2013.01); *G06Q 10/101* (2013.01); *G06Q 10/067* (2013.01); *G06Q 10/0637* (2013.01)
USPC ........................................... 717/105; 705/1.1

(58) Field of Classification Search
CPC ............ G06Q 10/067; G06Q 10/0637; G06Q 10/101; G06Q 10/06
USPC .................... 717/100, 105; 705/1.1
See application file for complete search history.

(56) References Cited

U.S. PATENT DOCUMENTS

| | | | |
|---|---|---|---|
| 2004/0122693 A1* | 6/2004 | Hatscher et al. | 705/1 |
| 2004/0181425 A1* | 9/2004 | Schwerin-Wenzel et al. | 705/1 |
| 2004/0220825 A1* | 11/2004 | Schwerin-Wenzel et al. | 705/1 |
| 2004/0230447 A1* | 11/2004 | Schwerin-Wenzel et al. | 705/1 |
| 2005/0055667 A1* | 3/2005 | Beringer et al. | 717/108 |
| 2008/0263503 A1* | 10/2008 | Polly et al. | 717/100 |
| 2011/0078048 A1* | 3/2011 | Becker et al. | 705/27.1 |

* cited by examiner

*Primary Examiner* — Jonathan C Teixeira Moffat
*Assistant Examiner* — Lynda Dinh
(74) *Attorney, Agent, or Firm* — Mintz Levin Cohn Ferris Glovsky and Popeo, P.C.

(57) ABSTRACT

A streamlined, dynamic definition of a customized user interface that presents content from a variety of service providers or sources can be provided. A server can retrieve a list of underlying business object nodes required for presentation of an organization-specific user interface corresponding to an organization from which a call for an instance of the organization-specific user interface is received at the server. A portal business object that matches a structure of the organization-specific user interface can be created that includes one portal business object node corresponding to each user interface element of a structure of the organization-specific user interface. Access to the portal business object can be provided for a user interface model that creates the organization-specific user interface by calling the underlying business object nodes according to the portal business object. Related articles, systems, and the like are disclosed as well.

19 Claims, 6 Drawing Sheets

SIMPLIFIED BUSINESS OBJECT MODEL FOR A USER INTERFACE

TECHNICAL FIELD

The subject matter described herein relates to the use of simplified business object models for providing user interfaces.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like. The core software platform of an ERP software architecture can be provided as a standalone, customized software installation that runs on one or more processors that are under the control of the organization or, alternatively, provided via a software as a service (SaaS) delivery over a network such as the internet. In an instance in which ERP functionality is provided via SaaS delivery, the ERP system architecture can be hosted on computing hardware such as servers and data repositories that are maintained remotely from the organization's location and accessed by authorized users at the organization via a thin client, such as for example a web browser, over a network.

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

SUMMARY

In one aspect, a computer-implemented method includes a server retrieving a list of underlying business object nodes required for presentation of an organization-specific user interface corresponding to an organization from which the server has received a call for an instance of the organization-specific user interface. A portal business object is created that matches a structure of the organization-specific user interface and that includes one portal business object node corresponding to each user interface element of a structure of the organization-specific user interface. Each user interface element has a dependency upon at least one of the underlying business object nodes. Access is provided to the portal business object for a user interface model that creates the organization-specific user interface by calling the underlying business object nodes according to the portal business object.

In some variations one or more of the following can optionally be included. The portal business object can be created in a Service Adaptation Description Language (SADL). The server system can receive, during a runtime from a client machine, the call for the instance of the organization-specific user interface. At least some of the dependencies of the user interface elements upon the at least one of the underlying business object nodes can be defined at design time. The method can also further include receiving a change to the organization-specific user interface from a key user of the organization via a UI modification user interface, and updating the list to reflect a change to one of the dependencies and/or to add a new dependency. Alternatively or in addition, the method can further include receiving a user interface modification via a UI development user interface provided by the user interface model, creating a new portal business object node in the portal business object if the new dependency between the new element or existing element; and the new portal business object node, filling the new portal business object node with a default initial value, and establishing the new dependency between the new element and/or existing element and the new portal business object node. The user interface modification can include one or more of an addition of a new element to the user interface and a modification of an existing element of the user interface. The new element and/or existing element can require a new dependency upon an additional underlying business object node that is not on the list. The creating of the portal business object comprises dynamically defining the portal business object during runtime based on a user interface model definition established prior to runtime.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages. For example, problems that otherwise might arise in providing a customized user interface that presents content from a variety of service providers or sources can be avoided by allowing a user interface model to access a single portal BO that defines the current state of the customized user interface. Further customizations of the user interface are also facilitated without the need for hard coding of each new association or dependency between an element of the customized user interface and one or more underlying business objects and nodes of such underlying business objects. The ability to provide simplified design of and access to a customized user interface can dramatically lower the total cost of ownership of a software platform that integrates multiple functionalities according to an organization's specific business configuration.

It should be noted that, while the descriptions of specific implementations of the current subject matter make reference to delivery of enterprise resource planning software to multiple organizations via a multi-tenant system, the current subject matter is applicable to other types of software and data services access as well. Furthermore, all discussions of possible user interface interactions in the following description of various implementations of the current subject matter are intended to be merely illustrative and completely non-limiting. The scope of the subject matter claimed below therefore should not be limited except by the actual language of the claims.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein, and together with the description, help explain some of the principles associated with the disclosed implementations. In the drawings.

When practical, similar reference numbers denote similar structures, features, or elements.

DETAILED DESCRIPTION

In a service oriented architecture (SOA), such as for example a SaaS-based ERP application, the basis of a user interface (UI) presented to the thin client can be a business object (BO). The BO for each UI can be defined based on the specific business use or configuration of the organization or user to which the UI corresponds. In instances in which multiple organizations or discrete users (hereinafter referred to generally as "users") share core functionality of a service oriented architecture with the ability to customize user-specific functionality, particularly via a UI with one or more user-specific aspects or features, each customized feature or aspects for each user can require its own one or more business objects. Thus, several business objects can be needed to perform the tasks normally possible via a single UI.

Figure 1:
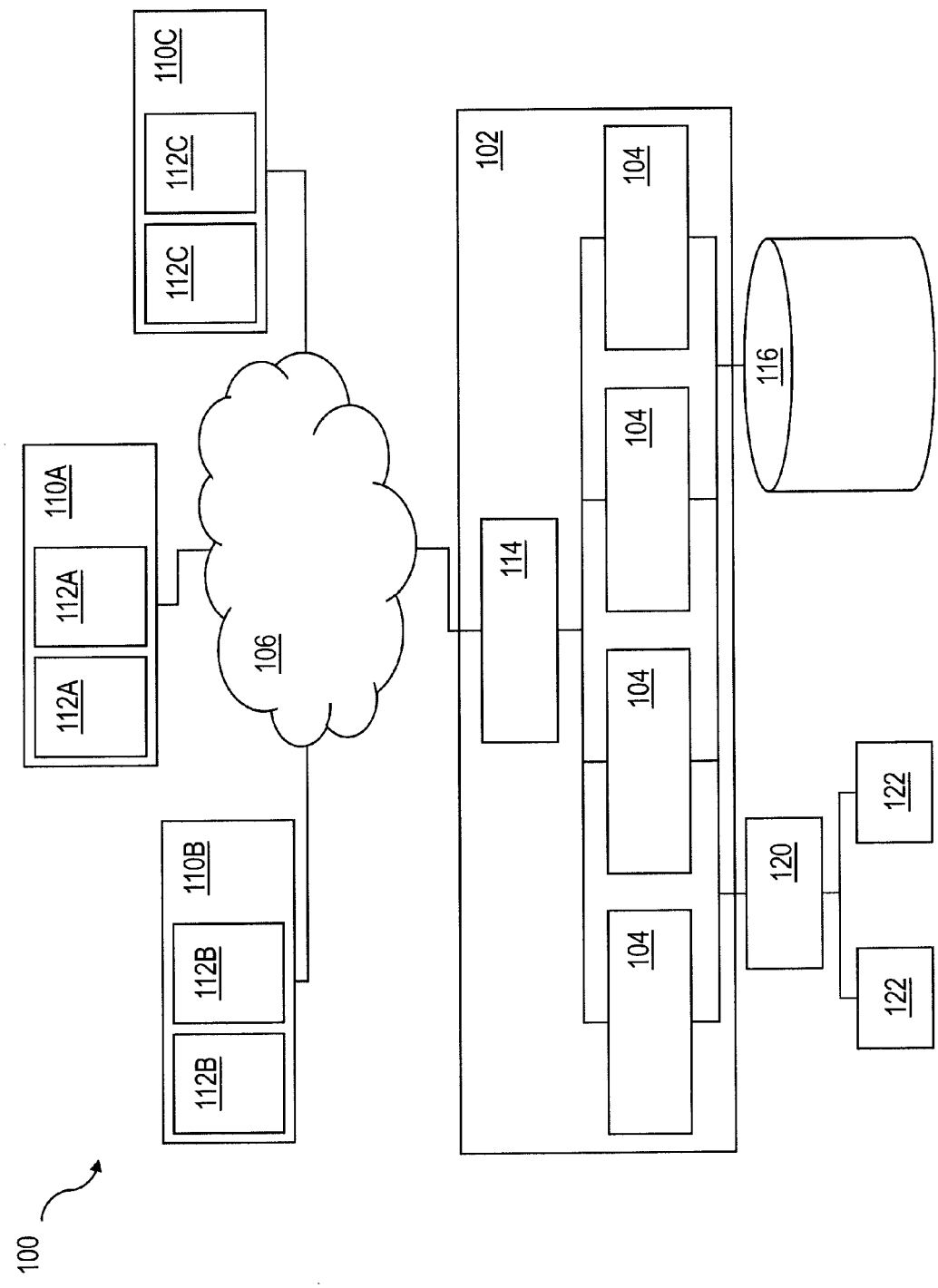
FIG. 1 is a diagram showing an example of a multi-tenant approach to providing customized software services to multiple organizations from a single architecture.

FIG. 1 shows a block diagram of a multi-tenant implementation of a software delivery architecture 100 that includes an application server 102, which can in some implementations include multiple server systems 104 that are accessible over a network 106 from client machines operated by users at each of multiple organizations 110A-110C (referred to herein as "tenants" of a multi-tenant system) supported by a single software delivery architecture 100. One example of such a software delivery architecture can include features similar to those of the Business ByDesign™ software available from SAP AG (Walldorf, Germany). For a system in which the application server 102 includes multiple server systems 104, the application server can include a load balancer 112 to distribute requests and actions from users at the one or more organizations 110A-110C to the one or more server systems 104. One or more users who are members of or otherwise associated with the organization can access the software delivery architecture across the network using a user interface 112A, 112B, 112C displayed via a thin client, such as for example a web browser or the like, or other portal software running on a client machine. Each organization 110A-110C can have one or more customized user interfaces 112A, 112B, 112C that reflects the needs of the business configuration of that organization and/or specific business configurations of sub-groups, divisions, departments, etc. of the organization. One or more users at the organization can be designated as a key user who has administrative access and is therefore capable of making modifications to the customized user interface 112A, 112B, or 112C of the organization. The application server 102 can access data and data objects stored in one or more data repositories 116. An external service provider portal 120 can also be provided to facilitate integration of software functionality provided by one or more external service providers 122. Examples of external service providers 122 can include, but are not limited to, payroll programs, human resources programs, accounting programs, or the like.

Figure 2:
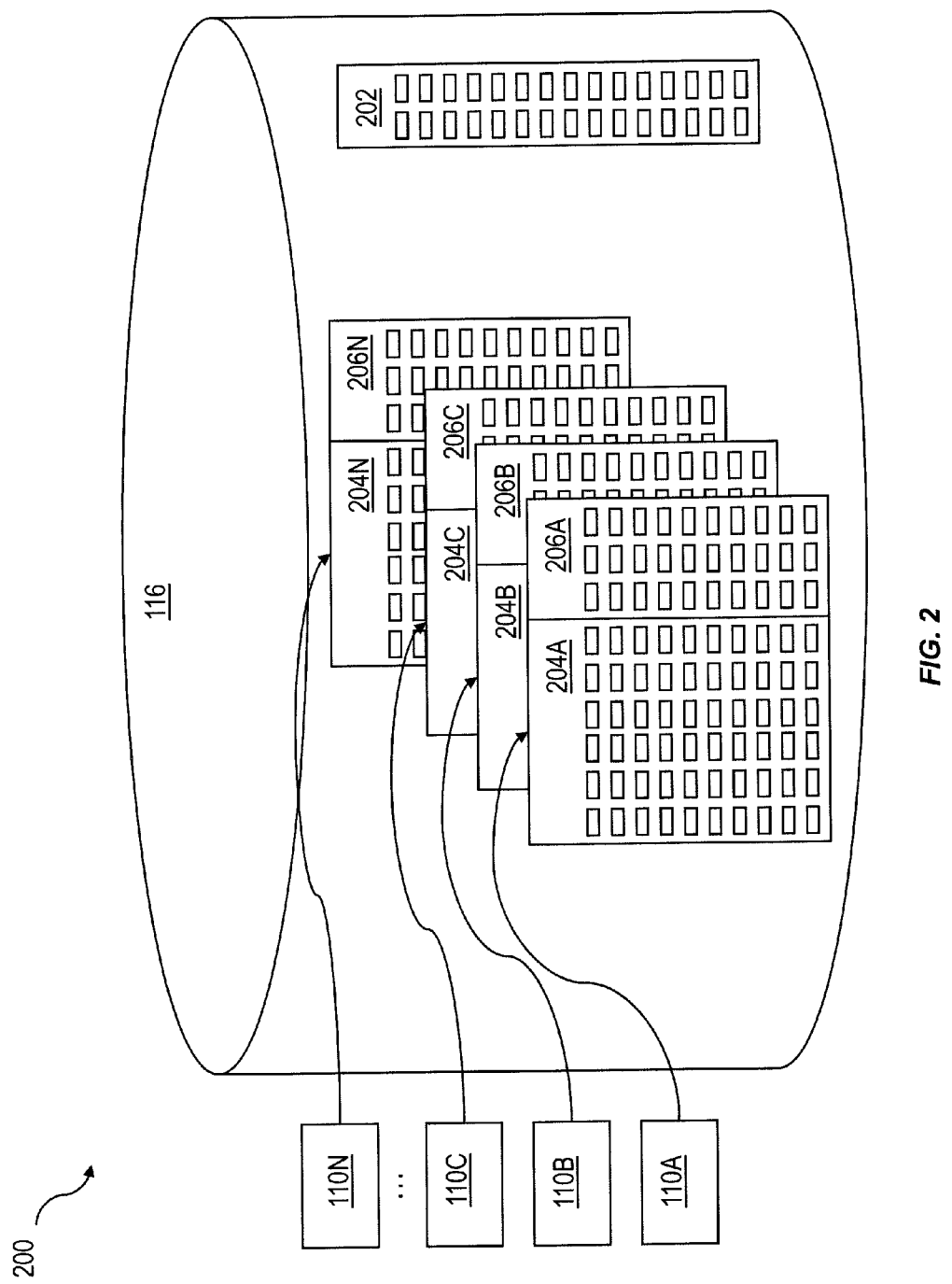
FIG. 2 is a diagram showing storage of both core software package data objects and tenant-specific data objects for each of multiple tenants of a multi-tenant system.

To provide for customization of the core software platform for each of multiple organizations supported by a single software delivery architecture 100, the data and data objects stored in the one or more repositories 116 that are accessed by the application server 102 can include three types of content as shown in FIG. 2: core software platform content 202, system content 204, and tenant content 206. Core software platform content 202 includes content, that represents core functionality and is not modifiable by a tenant. System content 204 can in some examples be created by the runtime of the core software platform and can include core data objects that are modifiable with data provided by each tenant. For example, if the core software platform is an ERP system that includes inventory tracking functionality, the system content 204A-204N can include data objects for labeling and quantifying inventory. The data retained in these data objects are tenant-specific: for example, each tenant 110A-110N stores information about its own inventory. Tenant content 206A-206N includes data objects or extensions to other data objects that are customized for one specific tenant 110A-110N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 206 can include condition records in generated condition tables, access sequences, price calculation results, or any other tenant-specific values. A combination of the software platform content 202 and system content 204 and tenant content 206 of a specific tenant are presented to users from that tenant such that each tenant is provided access to a customized solution whose data are available only to users from that tenant.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 102 that includes multiple server systems 104 that handle processing loads distributed by a load balancer 114. Potential benefits from such an arrangement can include, but are not limited to, high and reliably continuous application server availability and minimization of unplanned downtime, phased updating of the multiple server systems 104 to permit continuous availability (one server system 104 can be taken offline while the other systems continue to provide services via the load balancer 114), scalability via addition or removal of a server system 104 that is accessed via the load balancer 114, and de-coupled lifecycle processes (such as for example system maintenance, software upgrades, etc.) that enable updating of the core software independently of tenant-specific customizations implemented by individual tenants.

Figure 3:
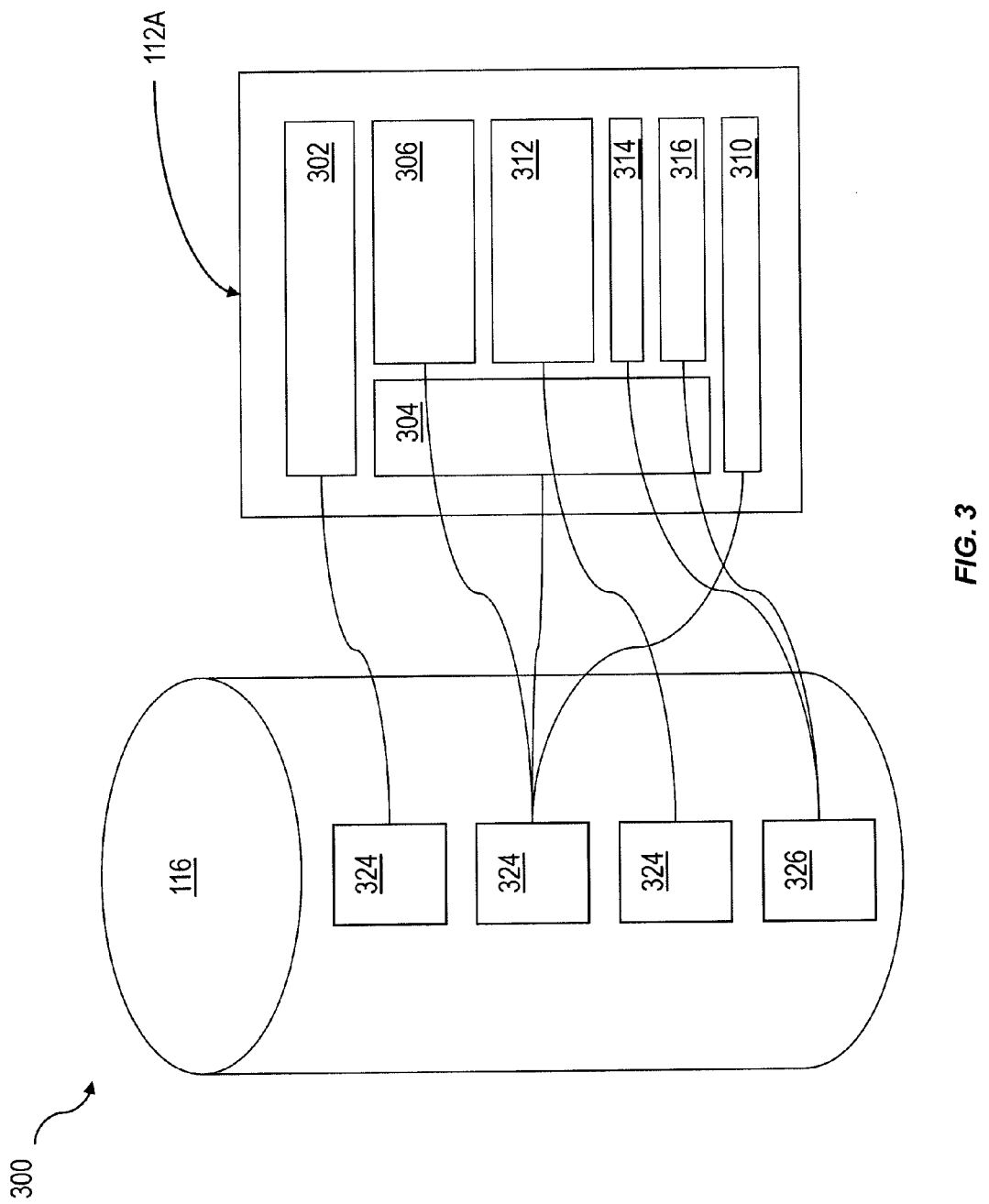
FIG. 3 is a diagram showing dependencies of different elements of a user interface upon multiple business objects.

To provide a customized UI, for example UI 112A shown in FIG. 3, the various elements 302, 304, 306, 310, 312, 314, 316 of the UI 112A, which can be tables, text, images, graphics, dynamic applets, or the like, may draw from or have a dependency on several underlying business objects 320, 322, 324, 326 drawn from multiple service providers. For example, as shown in FIG. 3, a first element 324 can depend on a first business object 320, a second element 304 as well as a third element 306 and a fourth element 310 can depend on a second business object, a fifth element 312 can depend on a third business object 324, and a sixth element 314 and a seventh element 316 can depend on a fourth business object 326. In the example of a multi-tenant software delivery architecture such as is depicted in FIG. 1 and FIG. 2 and described above, presentation of each of the first through fourth business objects 320, 322, 324, 326 can include one or more of core software platform content 202, system content 204, and tenant content 206 drawn from the one or more repositories 116.

It is generally advantageous for a UI to access a single business object (BO) as an entry point for a model of the UI. A business object can be a data object that reflects aspects of a specific business configuration for users of a system. For a hierarchical user interface model, which is typical, all nodes of the BO or BOs upon which a UI model relies can advantageously be reachable via associations starting from a root node of a BO that is assigned to a root node of the UI model. An existing approach to this issue is the use of so called controller objects (COs) or enhanced controller objects (ECOs) to aggregate multiple underlying BOs that are relied upon to produce a UI. A CO or an ECO, which is defined at design time, can define one BO with nodes and associations which are mapped from nodes and associations of several other data objects or BOs. However, because an ECO or CO is needed for each UI to be provided by the UI model, this approach can place a substantial burden on a UI developer (UID) and can limit the ability of key users at the various organizations making use of the tenants to modify the content presented in a UI to other users at the organization according to the business configuration or business needs of the organization. A UI can undergo frequent changes during development and even use. As the UI changes, its respective CO or ECO must also be adapted. In some cases, this process is at best inconvenient. In others, it might not be possible.

Figure 4:
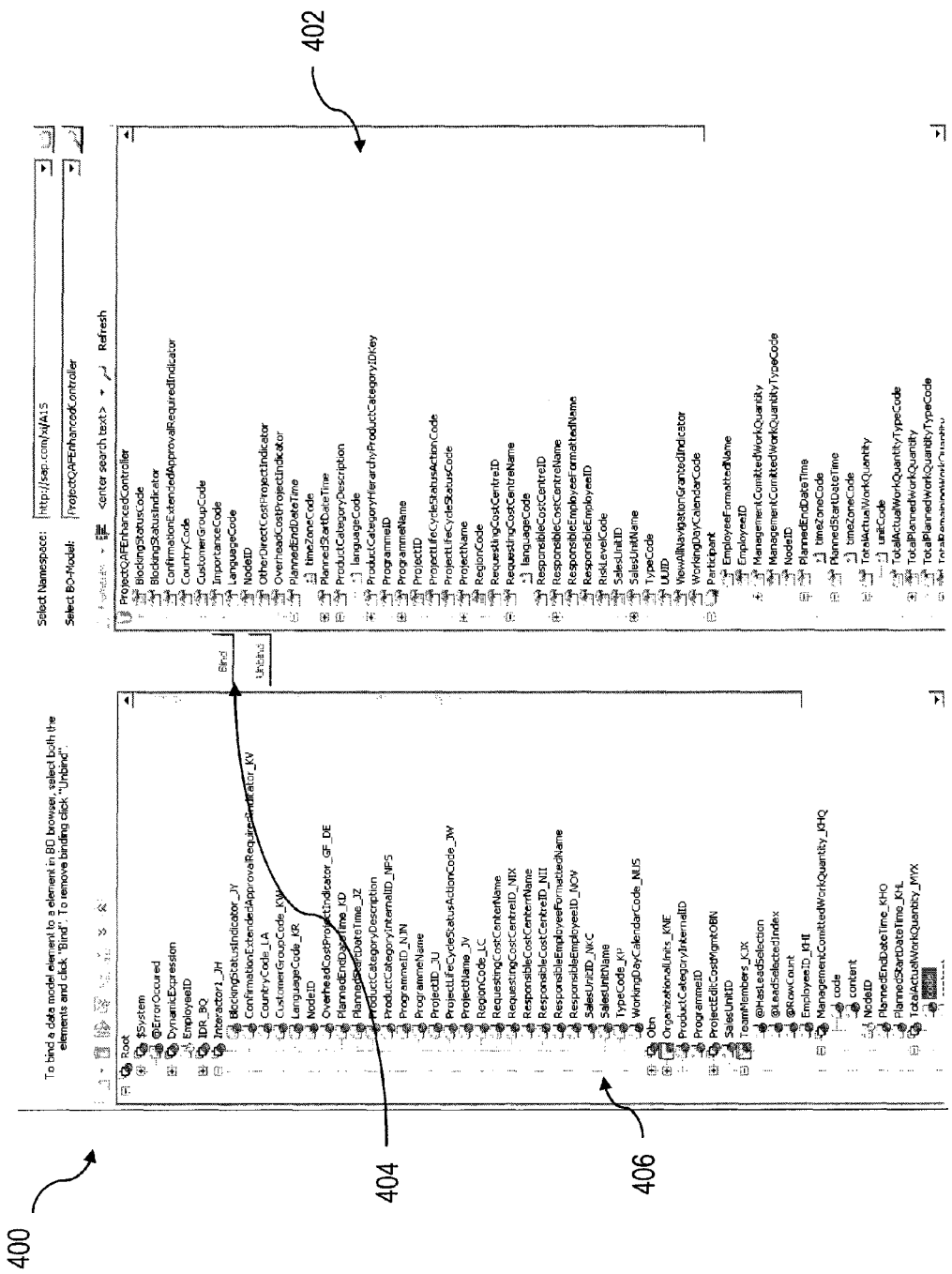
FIG. 4 is a screenshot showing features according to an implementation of the current subject matter.

An approach to the problem of having to frequently update one or more BOs for each change to a UI is a "frontend service adaptation" (FSA) in which associations from the CO or ECO to other nodes outside the CO or ECO are defined to allow traversal of these extra-BO associations. Such associations can be introduced to the UI model by UI flexibility changes enacted by a key user at a specific organization who modifies one or more features of an organization-specific UI according to one or more business configurations needed by users at the organization. FIG. 4 shows a screenshot of a graphical user interface 400 providing a display mode by which such associations can be created. Nodes of available business objects that can be incorporated in a user interface can be listed in a node listing 402. One or more controls 404 (in this example, "bind" and "unbind" buttons) can be provided to allow linking of nodes to UI elements displayed in an element listing 406.

If the nodes belonging to a new or modified association between a UI structure or element and a BO node have not yet been created, these nodes must be created in the process of creating the association. In a display mode, such as is shown in FIG. 4, this creation process can in some examples require that the key user manually establish one or more dummy or placeholder BOs to enable creation of the required associations, for example if the node to be linked is not shown in the node listing 402. This kind of requirement can be quite burdensome and can also lead to errors or redundancies in the definition of associations between UI elements and underlying data objects or BOs.

Furthermore, creation of the associations during display mode is sometimes not possible as the display user may not have the authorization to modify data. Additionally, even if the nodes can be created, the UI must verify whether data are entered in the adapted field, and if not, the additional nodes should be deleted. Also, if the list 402 of available nodes for inclusion in the UI includes fields from different nodes (even inside the ECO) several retrieves of data from the one or more repositories 116 can be required to collect the data for a whole line of the list. Repeated collection of data from several nodes of several BOs can substantially raise the total cost of ownership and can significantly lower the performance of such a system. Additionally, use of a frontend service adaptation (FSA) approach to handle modifications of custom UI features can require Java or a comparable manner of supporting remote applets. If it is desired to avoid reliance on Java, another approach is required.

Figure 5:
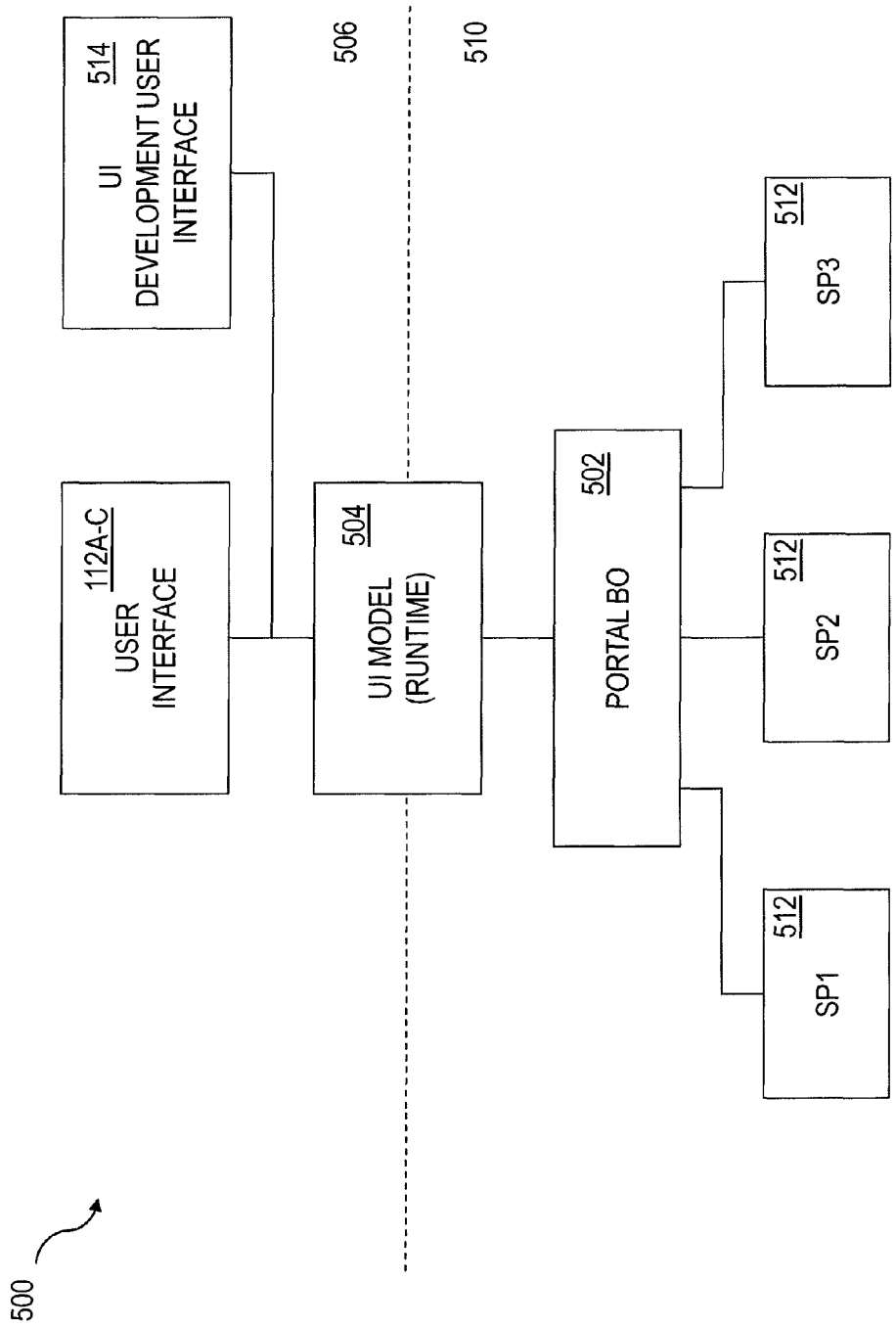
FIG. 5 is a diagram showing use of a virtual business object in conjunction with a user interface model to provide a customized user interface.

Implementations of the current subject matter can provide a single, unified portal BO for a specific UI which exactly matches the UI model and its needs. As shown in the diagram 500 of FIG. 5, the portal BO 502 can be defined during the runtime when the specifics of the UI model 504 are known. The UI model 504 can straddle the front end 506 and back end 510 of the architecture with the UI 112A-C being presented to a user, for example via a thin client, in the front end 506. In this manner, dynamic events that might impact and/or potentially cause problems with the UI model 504 based on a BO or multiple BOs that are static and established at design time, can be handled, even in the event that one or more aspects of the UI 112A-C need to be redefined based on changes entered by key users of the organization. In one example, the portal BO 502 can be defined using the Service Adaptation Description Language (SADL). Using SADL or another language or approach with similar functionality, a "virtual" portal BO 502 can be defined "on-the-fly" or dynamically during runtime based on the actual UI model 504 in place at runtime.

According to some implementations using SADL or comparable languages to prepare a virtual portal BO 502, for fields of the UI model 504 that are based on a frontend service adaptation (FSA) approach, the associations of these fields with underlying data objects or other BOs can be made part of the SADL model itself and therefore hidden from the UI 112A-C. In this manner, if the associations do not exist the field is not retrieved and an initial value can instead be provided for this field in the SADL BO node. In other words, the functionality of a display mode, such as that in FIG. 4, presented to a key user for making modifications to an organization-specific customized UI 112A-C can behave exactly as the key user might expect if all of the underlying data objects were static and fully defined in a design-time ECO or CO. In implementations of the current subject matter, no creation of placeholder nodes needs to occur, and there is therefore no need to provide for deletion of the placeholder nodes of those associations if they are not filled with data.

In some implementations, a list of existing associations needed for the UI 112A-C to be presented by the UI model 504 can be mapped to or otherwise provided by or within the portal BO node 502 such that only the portal BO node 502 needs to be retrieved to obtain the entirety of the list. If a UI Model 504 uses the same node, field, or the like at different places, all those nodes and fields can be mapped to one place in the SADL BO. Reuse of such mappings can lower the number of retrieve calls required to be made to the underlying BO node. All issues regarding the handling (create, modify, delete) of specific BO instances can be handled in the backend by one or more service providers 512 that provide the respective BOs. As noted above, service providers 512 can include both functionalities of the core software platform as well as services provided by third party software packages with which the core software package is designed to interface and integrate usage for the various organizations using the tenants of a multi-tenant system. Thus, the UI runtime can focus on its primary task, which is providing for seamless user interaction.

A UI development user interface 514 can be provided by the UI model 504 separately from the UI 112A-C such that the process of modifying the UI 112A-C is hidden from a normal (i.e. not an administrator or key user) at the organization. Also, administrators or key users can use the UI 112A-C without distraction by the capabilities of the UI development user interface 514. The UI development user interface 514 can present a list of underlying user interface nodes that can be associated with one or more UI elements presented in the UI 112A-C. If a UI element to be added or modified by the UI development user interface 514 requires an association between an element of the UI 112A-C with an underlying BO node that does not yet exist, the underlying BO node is not retrieved, but rather an initial value for the underlying BO node is initiated in a corresponding temporary node created in the portal BO 502. In this manner, the functionality of a display mode, such as that in FIG. 4, presented to a key user for making modifications to an organization-specific customized UI 112A-C can behave exactly as the key user might expect if all of the underlying data objects were static and fully defined in a design-time ECO or CO. In implementations of the current subject matter, no creation of placeholder nodes needs to occur, and there is therefore no need to provide for deletion of the placeholder nodes of those associations if they are not filled with data.

Figure 6:
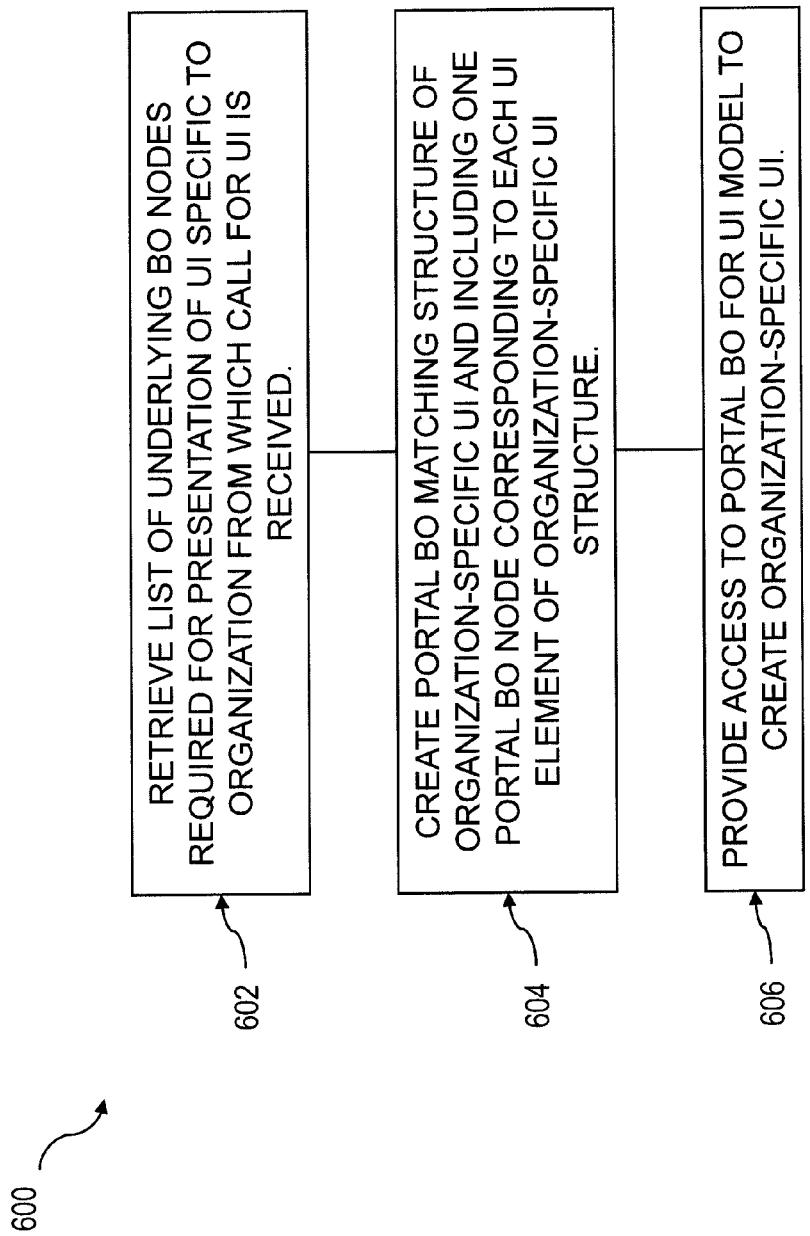
FIG. 6 is a process flow diagram showing aspects of a method according to the current subject matter.

FIG. 6 shows a process flow chart 600 illustrating aspects of an method according to one or more implementations of the current subject matter. At 602, upon receipt by a server, such as for example an application server 102 as shown in FIG. 1, of a call from a client machine for a UI during runtime, the server can retrieve, from a repository, a list of underlying BO nodes required for presentation of a UI that is specific to the organization from which the call is received. The underlying BO nodes can be provided by one or more service providers 512, which can include a core software platform provided by the server. Using the list, at 604 a portal BO 502 is created that matches a structure of the organization-specific UI and that includes a plurality of portal BO nodes such that each portal BO node corresponds to one UI element of the structure of the organization-specific UI. Each user interface element can depend upon at least one of the underlying business object nodes. In a further variation, all fields of each element of the UI can belong to the portal BO node to which the structure or element corresponds.

At 606, a UI model 504 accesses the portal BO 502 to create the organization-specific UI for presentation to a user. The UI model 504 can be implemented on the server, at a front end machine such as a client machine that presents the UI, or on a combination of the server and one or more front end machines. In some implementations, the portal BO 502 can be a virtual BO created in a programming language, for example SADL. All issues related to provision of the portal BO 502 and handling of access by the portal BO 502 to the underlying BOs and data objects that are associated with the customized UI can in some implementations be addressed using a virtual BO framework, which handles only BO-related issues while the UI runtime handles UI-related issues.

In further variations, a key user can make a change to the organization-specific UI, for example using a display mode 400 as shown in FIG. 4. The change can add a new element or modify an existing element of the user interface and can change an existing dependency between an element and an underlying BO node or can add a new dependency between an existing or new element and one or more underlying BO nodes. When a new element is added or an existing element is modified, one or more new associations can be created by associating the new or modified element with a temporary node created in the portal BO.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one processor, cause the at least one processor to perform operations comprising:

retrieving by a server, a list of underlying business object nodes required for presentation of an organization-specific user interface corresponding to an organization from which a call for an instance of the organization-specific user interface is received at the server;

creating a portal business object that matches a structure of the organization-specific user interface and that includes one portal business object node corresponding to each user interface element of a plurality of user interface elements of a structure of the organization-specific user interface, each user interface element of the plurality of user interface elements having a dependency upon at least one of the underlying business object nodes, the creating of the portal business object comprising dynamically defining the portal business object during runtime based on a user interface model definition established prior to runtime, the user interface model creating the organization-specific user interface;

modifying the organization-specific user interface, the modifying comprising one or more of adding a new element to the organization-specific user interface and modifying an existing element of the organization-specific user interface, the adding of the new element or the modifying of the existing element requiring a new dependency upon an additional underlying business object node that is not on the list;

creating a new portal business object node in the portal business object; establishing the new dependency between the new element or existing element and the new portal business object node; and providing access to the portal business object for the user interface model by calling the underlying business object nodes according to the portal business object.

2. The computer program product of claim 1, wherein the portal business object is created in a Service Adaptation Description Language (SADL).

3. The computer program product of claim 1, wherein the operations further comprise receiving, during a runtime at the server from a client machine, the call for the instance of the organization-specific user interface.

4. The computer program product of claim 1, wherein at least some of the dependencies of the plurality of user interface elements upon the at least one of the underlying business object nodes are defined at design time.

5. The computer program product of claim 1, wherein the operations further comprise:

receiving a change to the organization-specific user interface from a key user of the organization via a UI modification user interface; and updating the list to change one of the dependencies of one of the plurality of user interface elements and/or to add a new dependency from a user interface element of the plurality of user interface elements or a new user interface element upon at least one of the underlying business object nodes, the updating of the list occurring to reflect the change to the organization-specific user interface.

6. The computer program product of claim 1, wherein the operations further comprise:

receiving a user interface modification via a UI development user interface, the UI development user interface being provided by the user interface model, the user interface modification requiring the modifying of the organization-specific user interface.

7. The computer program product of claim 1, wherein the list of underlying business object nodes includes business object nodes from a plurality of business objects that are distinct from the portal business object.

8. The computer program product of claim 7, wherein the plurality of business objects includes business objects from at least two different service providers.

9. A system comprising:
at least one processor; and a non-transitory machine-readable medium storing instructions that, when executed by the at least one processor, cause the at least one processor to perform operations comprising:
retrieving by a server, a list of underlying business object nodes required for presentation of an organization-specific user interface corresponding to an organization from which a call for an instance of the organization-specific user interface is received at the server;
creating a portal business object that matches a structure of the organization-specific user interface and that includes one portal business object node corresponding to each user interface element of a plurality of user interface elements of a structure of the organization-specific user interface, each user interface element of the plurality of user interface elements having a dependency upon at least one of the underlying business object nodes, the creating of the portal business object comprising dynamically defining the portal business object during runtime based on a user interface model definition established prior to runtime, the user interface model creating the organization-specific user interface;
modifying the organization-specific user interface, the modifying comprising one or more of adding a new element to the organization-specific user interface and modifying an existing element of the organization-specific user interface, the adding of the new element or the modifying of the existing element requiring a new dependency upon an additional underlying business object node that is not on the list;
creating a new portal business object node in the portal business object; establishing the new dependency between the new element or existing element and the new portal business object node; and
providing access to the portal business object for the user interface model by calling the underlying business object nodes according to the portal business object.

10. The system of claim 9, wherein the portal business object is created in a Service Adaptation Description Language (SADL).

11. The system of claim 9, wherein the operations further comprise receiving, during a runtime at the system from a client machine, the call for the instance of the organization-specific user interface.

12. The system of claim 9, wherein at least some of the dependencies of the plurality of user interface elements upon the at least one of the underlying business object nodes are defined at design time.

13. The system of claim 9, wherein the operations further comprise:
receiving a change to the organization-specific user interface from a key user of the organization via a UI modification user interface; and
updating the list to a change one of the dependencies of one of the plurality of user interface elements and/or to add a new dependency from a user interface element of the plurality of user interface elements or a new user interface element upon at least one of the underlying business object nodes, the updating of the list occurring to reflect the change to the organization-specific user interface.

14. The system of claim 9, wherein the operations further comprise:
receiving a user interface modification via a UI development user interface, the UI development user interface being provided by the user interface model, the user interface modification requiring the modifying of the organization-specific user interface.

15. A computer-implemented method comprising:
retrieving by a server, a list of underlying business object nodes required for presentation of an organization-specific user interface corresponding to an organization from which a call for an instance of the organization-specific user interface is received at the server;
creating a portal business object that matches a structure of the organization-specific user interface and that includes one portal business object node corresponding to each user interface element of a plurality of user interface elements of a structure of the organization-specific user interface, each user interface element of the plurality of user interface elements having a dependency upon at least one of the underlying business object nodes, the creating of the portal business object comprising dynamically defining the portal business object during runtime based on a user interface model definition established prior to runtime, the user interface model creating the organization-specific user interface;
modifying the organization-specific user interface, the modifying comprising one or more of adding a new element to the organization-specific user interface and modifying an existing element of the organization-specific user interface, the adding of the new element or the modifying of the existing element requiring a new dependency upon an additional underlying business object node that is not on the list;
creating a new portal business object node in the portal business object;
establishing the new dependency between the new element or existing element and the new portal business object node; and
providing access to the portal business object for the user interface model by calling the underlying business object nodes according to the portal business object.

16. The computer-implemented method of claim 15, further comprising receiving, during a runtime at the system from a client machine, the call for the instance of the organization-specific user interface.

17. The computer-implemented method of claim 15, wherein at least some of the dependencies of the plurality of user interface elements upon the at least one of the underlying business object nodes are defined at design time.

18. The computer-implemented method of claim 15, further comprising:
receiving a change to the organization-specific user interface from a key user of the organization via a UI modification user interface; and
updating the list to change one of the dependencies of one of the plurality of user interface elements and/or to add a new dependency from a user interface element of the plurality of user interface elements or a new user interface element upon at least one of the underlying business object nodes, the updating of the list occurring to reflect the change to the organization-specific user interface.

19. The computer-implemented method of claim 15, further comprising:
receiving a user interface modification via a UI development user interface, the UI development user interface being provided by the user interface model, the user interface modification requiring the modifying of the organization-specific user interface.

* * * * *